United States Patent
Allen et al.

(10) Patent No.: US 6,475,608 B2
(45) Date of Patent: *Nov. 5, 2002

(54) MULTI-LAYER IRIDESCENT FILMS

(75) Inventors: Scott I. Allen, Hopewell Junction, NY (US); Ramakrishna Shetty, Pelham, NY (US)

(73) Assignee: Engelhard Corporation, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,740

(22) Filed: Nov. 16, 1998

(65) Prior Publication Data

US 2001/0009722 A1 Jul. 26, 2001

(51) Int. Cl.$^7$ .............................. B32B 7/02; B32B 27/36
(52) U.S. Cl. ...................... 428/212; 428/480; 359/577; 359/580; 359/584; 359/586; 359/588; 359/589
(58) Field of Search ................................. 428/212, 480, 428/483, 910; 359/577, 580, 586, 587, 584, 588, 589

(56) References Cited

U.S. PATENT DOCUMENTS

| | | | |
|---|---|---|---|
| 3,565,985 A | | 2/1971 | Schrenk et al. ............. 264/171 |
| 3,773,882 A | | 11/1973 | Schrenk ...................... 264/171 |
| 4,310,584 A | | 1/1982 | Cooper et al. .............. 428/212 |
| 4,937,134 A | | 6/1990 | Schrenk et al. ............. 428/213 |
| 5,089,318 A | | 2/1992 | Shetty et al. ............... 428/212 |
| 5,451,449 A | * | 9/1995 | Shetty et al. ............... 428/195 |
| 5,882,774 A | * | 3/1999 | Jonza et al. ................ 428/212 |
| 6,012,820 A | * | 1/2000 | Weber et al. ............... 362/102 |
| 6,080,467 A | * | 6/2000 | Weber et al. ............... 359/577 |
| 6,082,876 A | * | 7/2000 | Hanson et al. .............. 362/186 |
| 6,207,260 B1 | * | 3/2001 | Wheatley et al. ........... 428/212 |

FOREIGN PATENT DOCUMENTS

| | | |
|---|---|---|
| EP | 0 488 544 A1 * | 6/1992 |
| WO | WO9619347 | 6/1996 |
| WO | WO9701726 | 1/1997 |
| WO | WO9732726 | 9/1997 |

OTHER PUBLICATIONS

Database WPI Week 199743; Derwent Publications Ltd. AN 1997–461729; JP 09 211 784 A (Teijin Ltd.); Aug. 15, 1997; Abstract.

Database WPI Week 199743; Derwent Publications Ltd. AN 1997–461728; JP 09 211 783 A (Teijin Ltd.); Aug. 15, 1997; Abstract.

Schrenk et al., "Co–Extruded Elastomeric Optical Interference Film," Antec '88, 1703–1707).

* cited by examiner

*Primary Examiner*—Vivian Chen
(74) *Attorney, Agent, or Firm*—Dickstein, Shapiro, Morin & Oshinsky, LLP.

(57) ABSTRACT

A transparent iridescent thermoplastic resinous laminate film having at least 10 very thin layers of substantially uniform thickness, said layers being generally parallel, the contiguous adjacent layers being of different transparent thermoplastic resinous materials of which one is a naphthalate-based polyester or copolyester resin, the contiguous adjacent layers differing in refractive index by at least about 0.03.

19 Claims, No Drawings

MULTI-LAYER IRIDESCENT FILMS

FIELD OF THE INVENTION

The present invention relates to multilayer coextruded light-reflecting films which have a narrow reflection band because of light interference and contain a layer of naphthalate-based polyester.

BACKGROUND OF THE INVENTION

Iridescent multilayer films are composed of a plurality of generally parallel layers of transparent thermoplastic resinous material in which the contiguous adjacent layers are of diverse resinous material whose index of refraction differs by at least about 0.03. The film contains at least 10 layers and more usually at least 35 layers and, preferably, at least about 70 layers.

The individual layers of the film are very thin, usually in the range of about 30 to 500 nm, preferably about 50–400 nm, which causes constructive interference in light waves reflected from the many interfaces. Depending on the layer thickness and the refractive index of the polymers, one dominant wavelength band is reflected and the remaining light is transmitted through the film. The reflected wavelength is determined by the sum of the optical thickness of a pair of layers.

The quantity of the reflected light (reflectance) and the color intensity depend on the difference the two refractive indices, on the ratio of optical thicknesses of the layers, on the number of layers and on the uniformity of the thickness. If the refractive indices are the same, there is no reflection at all from the interfaces between the layers. In multilayer iridescent films, the refractive indices of contiguous adjacent layers differ by at least 0.03 and preferably by at least 0.06 or more. For first order reflections, reflectance is highest when the optical thicknesses of the layers are equal, although suitably high reflectances can be achieved when the ratio of the two optical thicknesses falls between 5:95 and 95:5. Distinct color reflections are obtained with as few as 10 layers. However, for maximum color intensity, it is desirable to have between 35 and 1000 or more layers. High color intensity is associated with a reflection band which is relatively narrow and which has high reflectance at its peak. It should be recognized that although the term "color intensity" has been used here for convenience, the same considerations apply for the invisible reflection in the ultraviolet and infrared ranges.

The multilayer films can be made by a chill-roll casting technique using a conventional single manifold flat film die in combination with a feedblock which collects the melts from each of two or more extruders and arranges then into the desired layer pattern. Feedblocks are described for instance in U.S. Pat. Nos. 3,565,985 and 3,773,882. The feedblocks can be used to form alternating layers of either two components or more (e.g. ABABAB . . . , ABCABC . . . or ACBCACBC . . . ). The very narrow multilayer stream flows through a single manifold flat film die where the layers are simultaneously spread to the width of the die and thinned to the final die exit thickness. The number of layers and their thickness distribution can be changed in inserting a different feedblock module. Usually, the outermost layer or layers on each side of the sheet are thicker than the other layers. This thicker skin may consist of one of the components which makes up the optical core, may be a different polymer which is utilized to impart desirable mechanical, heat sealing, or other properties, or may be a combination of these.

Examination of iridescent films of desirable optical properties revealed deficiencies in certain mechanical properties. For example, the adhesion between individual layers of the multilayer structure may be insufficient, and the film may suffer from internal delamination or separation of layers during use. The iridescent film is often adhered to paper or board for its decorative effect, and is then used for greeting cards, cartons, wrapping paper and the like. Delamination of the film is unsightly and may even lead to separation of the glued joints if carton. In addition, the solvent resistance and heat stability of such films are not as great as desired for widespread utilization.

In U.S. Pat. No. 4,310,584, these deficiencies are significantly overcome by using a thermoplastic terephthalate polyester or copolyester resin as the high refractive index component of the system in which two or more resinous material form a plurality of layers. While a substantial improvement was realized, it also required the use of two polymers from significantly different polymer families. That fact, in turn, means that there are inherent significant differences between the two polymers and their relative adhesion to each other, chemical resistance, toughness, etc. As a result, the film itself is generally no better with regard to a particular characteristic than the weaker or poorer of the polymers employed. If two polymers closely related were employed in order to maximize relative adhesion to one each other, or toughness, or chemical resistance, etc., the polymers involved did not have a sufficient difference in refractive index so as to create the desired iridescent color.

Schrenk and Wheatly (Co-extruded Elastomeric Optical Interference Film, Antec '88, 1703–1707) have reported the preparation of a multilayer light reflecting film co-extruded from two thermoplastic elastomers. The film which had one thermoplastic elastomer based on nylon and the other based on urethane, exhibited reversible changes in reflection spectra when deformed and relaxed. That is, this very specific combination had the ability of stretching without losing appearance characteristics. This type of films has been described in more detail in U.S. Pat. No. 4,937,134.

U.S. Pat. No. 5,089,318 discloses that further improvements in adhesion, solvent resistance and the like can be obtained by employing a thermoplastic elastomer (TPE) as one of the resinous materials. Such materials are copolymers of a thermoplastic hard segment such as polybutyl terephthalate, polyethylene terephthalate, polycarbonate, etc., and a soft elastomeric segment such as polyether glycols, silicone rubbers, polyetherimide and the like.

While prior art structures represented significant improvement in the areas of delamination resistance and better solvent stability, there were still some limitations with regard to these properties. In addition, iridescent films of the prior art still had deficiencies relative to their temperature stability, tensile strength and UV stability. The present invention surprisingly provides significant improvements over current known structures with regard to these properties.

SUMMARY OF THE INVENTION

It is, therefore an object of the invention to provide a transparent thermoplastic resinous laminate having good heat and solvent stability, good tensile strength, good delamination resistance, and good UV stability.

In one embodiment, the present invention provides a transparent thermoplastic resinous laminate film of at least 10 very thin layers of substantially uniform thickness, said layers being generally parallel, the contiguous adjacent layers being of different transparent thermoplastic resinous materials of which one is a naphthalate-based polyester or copolyester resin, the contiguous adjacent layers differing in refractive index by at least about 0.03.

In another embodiment, the present invention provides a transparent thermoplastic resinous laminate film of at least about 70 very thin layers of substantially uniform thickness, said layers being generally parallel, the contiguous adjacent layers being of different transparent thermoplastic resinous materials of which one is a polyethylene naphthalate polyester or copolyester, and the other is a polybutylene terephthalate polyester or copolyester, wherein the outermost layers are polybutylene terephthalate polyester.

Other objects and advantages of the present invention will become apparent from the following description and appended claims.

DETAILED DESCRIPTION OF THE INVENTION

It has now been found that the objectives of this invention are realized by employing a naphthalate-based polyester or copolyester resin as a component in the contiguous adjacent layers in the optical core of a transparent thermoplastic resinous laminate film. Preferably, the naphthalate-based polyester or copolyester is based on naphthalene dicarboxylate. Examples of usable polyester resin include polyethylene naphthalate and polybutylene naphthalate. Examples of usable copolyesters include copolyesters comprising ethylene naphthalate and/or butylene naphthalate. Preferably, the copolyester consists of ethylene naphthalate and butylene naphthalate.

The iridescent film of the present invention can be obtained by coextruding the naphthalate-based polyester or copolyester resin with a different transparent thermoplastic resin which is selected to differ in refractive index by at least 0.03 and preferably by at least 0.06. Among the other resinous materials which can be used are transparent thermoplastic polyester or copolyester resins characterized by a refractive index of about 1.55 to about 1.61. Examples of usable thermoplastic polyester resins include polyethylene terephthalate (PET) which is made by reacting either terephthalic acid or dimethyl terephthalate with ethylene glycol; polybutylene terephthalate (PBT) which is made by the catalyzed combination of 1,4-butanediol with either terephthalic acid or dimethyl terephthalate; and the various thermoplastic copolyesters which are synthesized using more than one glycol and/or more than one dibasic acid. PETG polyester, for example, is a glycol modified PET made from ethylene glycol and cyclohexanedimethanol (CHDM) and terephthalic acid; PCTA copolyester is an acid-modified copolyester of CHDM with terephthalic and isophthalic acids. Additional other resinous materials that can be coextruded with the naphthalate-based polyester or copolyester resin are listed in Table 1.

TABLE 1

| Polymer name: | Approximate Refractive Index |
|---|---|
| Poly(tetrafluoroethylene-co-hexafluoropropylene) | 1.338 |
| Poly(pentadecafluorooctyl acrylate) | 1.339 |
| Poly(tetrafluoro-3-(heptafluoropropoxy)propyl acrylate) | 1.346 |
| Poly(tetrafluoro-3-(pentafluoroethoxy)propyl acrylate) | 1.348 |

TABLE 1-continued

| Polymer name: | Approximate Refractive Index |
|---|---|
| Poly(tetrafluoroethylene) | 1.35 (–1.38) |
| Poly(undecafluorohexyl acrylate) | 1.356 |
| Poly(nonafluoropentyl acrylate) | 1.360 |
| Poly(tetrafluoro-3-(trifluoromethoxy)propyl acrylate) | 1.360 |
| Poly(pentafluorovinyl propionate) | 1.364 |
| Poly(heptafluorobutyl acrylate) | 1.367 |
| Poly(trifluorovinyl acetate) | 1.375 |
| Poly(octafluoropentyl acrylate) | 1.380 |
| Poly(pentafluoropropyl acrylate) | 1.385 |
| Poly(2-(heptafluorobutoxy)ethyl acrylate) | 1.390 |
| Poly(2,2,3,4,4,4-hexafluorobutyl acrylate) | 1.392 |
| Poly(trifluoroethyl acrylate) | 1.407 |
| Poly(2-(1,1,2,2-tetrafluoroethoxy)ethyl acrylate) | 1.412 |
| Poly(trifluoroisopropyl methacrylate) | 1.4177 |
| Poly(2,2,2-trifluoro-1-methylethyl methacrylate) | 1.4185 |
| Poly(2-(trifluoroethyoxy)ethyl acrylate) | 1.419 |
| Poly(trifluorochloroethylene) | 1.42–1.43 |
| Poly(vinylidene fluoride) | 1.42 |
| Poly(dimethylsilylene(poly(dimethyl siloxane)) | 1.43 |
| Poly(trifluoroethyl methacrylate) | 1.437 |
| Poly(oxypropylene) | 1.4495 |
| Poly(vinyl isobutyl ether) | 1.4507 |
| Poly(vinyl ethyl ether) | 1.4540 |
| Poly(oxyethylene) | 1.4563 |
| Poly(vinyl butyl ether) | 1.4563 |
| Poly(vinyl pentyl ether) | 1.4581 |
| Poly(vinyl hexy ether) | 1.4591 |
| Poly(4-methyl-1-pentene) | 1.459–1.465 |
| Cellulose acetate butyrate | 1.46–1.49 |
| Poly(4-fluoro-2-trifluoromethylstyrene) | 1.46 |
| Poly(vinyl octyl ether) | 1.4613 |
| Poly(vinyl 2-ethylhexyl ether) | 1.4626 |
| Poly(vinyl decyl ether) | 1.4628 |
| Poly(2-methoxyethyl acrylate) | 1.463 |
| Poly(butyl acrylate) | 1.4631 |
| Poly(butyl acrylate) | 1.466 |
| Poly(tert-butyl methacrylate) | 1.4638 |
| Poly(vinyl dodecyl ether) | 1.4640 |
| Poly(3-ethoxypropyl acrylate) | 1.465 |
| Poly(oxycarbonyl tetramethylene) | 1.465 |
| Poly(vinyl propionate) | 1.4665 |
| Poly(vinyl acetate) | 1.4665 |
| Poly(vinyl methyl ether) | 1.467 |
| Poly(ethyl acrylate) | 1.4685 |
| Poly(ethylene-co-vinyl acetate) (30%–20% vinyl acetate) | 1.47–1.50 |
| Cellulose propionate | 1.47–1.49 |
| Cellulose acetate propionate | 1.47 |
| Benzyl cellulose | 1.47–1.58 |
| Phenol-formaldehyde resins | 1.47–1.70 |
| Cellulose triacetate | 1.47–1.48 |
| Poly(vinyl methyl ether) (isotactic) | 1.4700 |
| Poly(3-methoxypropyl acrylate) | 1.471 |
| Poly(2-ethoxyethyl acrylate) | 1.471 |
| Poly(methyl acrylate) | 1.472–1.480 |
| Poly(isopropyl methacrylate) | 1.4728 |
| Poly(1-decene) | 1.4730 |
| Poly(propylene) (atactic, density 0.8575 g/cm$^3$) | 1.4735 |
| Poly(vinyl sec-butyl ether) (isotactic) | 1.4740 |
| Poly(dodecyl methacrylate) | 1.4740 |
| Poly(oxyethyleneoxysuccinoyl) (poly(ethylene succinate)) | 1.4744 |
| Poly(teradecyl methacrylate) | 1.4746 |
| Poly(ethylene-co-propylene) (EPR-rubber) | 1.4748–1.48 |
| Poly(hexadecyl methacrylate) | 1.4750 |
| Poly(vinyl formate) | 1.4757 |
| Poly(2-fluoroethyl methacrylate) | 1.4768 |
| Poly(isobutyl methacrylate) | 1.477 |
| Ethyl cellulose | 1.479 |
| Poly(vinyl acetal) | 1.48–1.50 |
| Cellulose acetate | 1.48–1.50 |
| Cellulose tripropionate | 1.48–1.49 |
| Poly(oxymethylene) | 1.48 |
| Poly(vinyl butyral) | 1.48–1.49 |

TABLE 1-continued

| Polymer name: | Approximate Refractive Index |
|---|---|
| Poly(n-hexyl methacrylate) | 1.4813 |
| Poly(n-butyl methacrylate) | 1.483 |
| Poly(ethylidene dimethacrylate) | 1.4831 |
| Poly(2-ethoxyethyl methacrylate) | 1.4833 |
| Poly(oxyethyleneoxymaleoyl) (poly(ethylene maleate)) | 1.4840 |
| Poly(n-propyl methacrylate) | 1.484 |
| Poly(3,3,5-trimethylcyclohexyl methacrylate) | 1.485 |
| Poly(ethyl methacrylate) | 1.485 |
| Poly (2-nitro-2-methylpropyl methacrylate) | 1.4868 |
| Poly(triethylcarbinyl methacrylate) | 1.4889 |
| Poly(1,1-diethyipropyl methacrylate) | 1.4889 |
| Poly(methyl methacrylate) | 1.4893 |
| Poly(2-decyl-1,3-butadiene) | 1.4899 |
| Poly(vinyl alcohol) | 1.49–1.53 |
| Poly(ethyl glycolate methacrylate) | 1.4903 |
| Poly(3-methylcyclohexyl methacrylate) | 1.4947 |
| Poly(cyclohexyl α-ethoxyacrylate) | 1.4969 |
| Methyl cellulose(low viscosity) | 1.497 |
| Poly(4-methylcyclohexyl methacrylate) | 1.4975 |
| Poly(decamethylene glycol dimethacrylate) | 1.4990 |
| Poly(urethanes) | 1.5–1.6 |
| Poly(1,2-butadiene) | 1.5000 |
| Poly(vinyl formal) | 1.50 |
| Poly(2-bromo-4-trifluoromethylstyrene) | 1.5 |
| Cellulose nitrate | 1.50–1.514 |
| Poly(sec-butyl α-chloroacrylate) | 1.500 |
| Poly(2-beptyl-1,3-butadiene) | 1.5000 |
| Poly(ethyl α-chloroacrylate) | 1.502 |
| Poly(2-isopropyl-1,3-butadiene) | 1.5028 |
| Poly(2-methylcyclohexyl methacrylate) | 1.5028 |
| Poly(propylene) (density 0.9075 g/cm$^3$) | 1.5030 |
| Poly(isobutene) | 1.505–1.51 |
| Poly(bornyl methacrylate) | 1.5059 |
| Poly(2-tert-butyl-1,3-butadiene) | 1.5060 |
| Poly(ethylene glycol dimethacrylate) | 1.5063 |
| Poly(cyclohexyl methacrylate) | 1.5066 |
| Poly(cyclohexanediol-1,4-dimethacrylate) | 1.5067 |
| Butyl rubber (unvulcanized) | 1.508 |
| Poly(tetrahydrofurfuryl methacrylate) | 1.5096 |
| Gutta percha (5) | 1.509 |
| Poly(ethylene) ionomer | 1.51 |
| poly(oxyethylene) (high molecular weight) | 1.51–1.54 |
| Poly(ethylene) (density 0.914 g/cm$^3$) | 1.51 |
| (density 0.94–0.945 g/cm$^3$) | 1.52–1.53 |
| (density 0.965 g/cm$^3$) | 1.545 |
| Poly(1-methylcyclohexyl methacrylate) | 1.5111 |
| Poly(2-hydroxyethyl methacrylate) | 1.5119 |
| Poly(vinyl chloroacetate) | 1.512 |
| Poly(butene) (isotactic) | 1.5125 |
| Poly(vinyl methacrylate) | 1.5129 |
| Poly(N-butyl-methacrylamide) | 1.5135 |
| Gutha percha (α) | 1.514 |
| Terpene resin | 1.515 |
| Poly(1,3-butadiene) | 1.5154 |
| Shellac | 1.51–1.53 |
| Poly(methyl α-chloroacrylate) | 1.517 |
| Poly(2-chloroethyl methacrylate) | 1.517 |
| Poly(2-diethylaminoethyl methacrylate) | 1.5174 |
| Poly(2-chlorocyclohexyl methacrylate) | 1.5179 |
| Poly(1,3-butadiene) (35% cis; 56% trans; 7% 1,2-content) | 1.5180 |
| Natural rubber | 1.519–1.52 |
| Poly(allyl methacrylate) | 1.5196 |
| Poly(vinyl chloride) + 40% dioctyl phthalate | 1.52 |
| Poly(acrylonitrile) | 1.52 |
|  | 1.5187 |
| Poly(methacrylonitrile) | 1.52 |
| Poly(1,3-butadiene) (high cis-type) | 1.52 |
| Poly(butadiene-co-acrylonitrile) | 1.52 |
| Poly(methyl isopropenyl icetone) | 1.5200 |
| Poly(isoprene) | 1.521 |
| Poly(ester) resin, rigid (ca, 50% styrene) | 1.523–1.54 |
| Poly(N-(2-methoxyethyl)methacrylamide) | 1.5246 |
| Poly(2,3-dimethylbutadiene) (methyl rubber) | 1.525 |
| Poly(vinyl chloride-co-vinyl acetate) (95/5–90/10) | 1.525–1.536 |
| Poly(acrylic acid) | 1.527 |
| Poly(1,3-dichioropropyl methacrylate) | 1.5270 |
| Poly(2-chloro-1-(chloromethyl)ethyl methacrylate) | 1.5270 |
| Poly(acrolein) | 1.529 |
| Poly(1-vinyl-2-pyrrolidone) | 1.53 |
| Hydrochlorinated rubber | 1.53–1.55 |
| Nylon 6: Nylon 6,6: Nylon 6, 10 (moulding) (Nylon-6-fiber: 1.515 transverse, 1.565 in fiber direction) | 1.53 |
| Poly(butadiene-co-styrene) (ca, 30% styrene) black copolymer | 1.53 |
| Poly(cyclohexyl α-chloroacrylate) | 1.532 |
| Poly(2-chloroethyl α-chloroacrylate) | 1.533 |
| Poly(butadiene-co-styrene) (ca, 75/25) | 1.535 |
| Poly(2-aminoethyl methacrylate) | 1.537 |
| Poly(furfuryl methacrylate) | 1.5381 |
| Proteins | 1.539–1.541 |
| Poly(butylmercaptyl methacrylate) | 1.5390 |
| Poly(1-phenyl-n-amyl methacrylate) | 1.5396 |
| Poly(N-methyl-methacrylamide) | 1.5398 |
| Cellulose | 1.54 |
| Poly(vinyl chloride) | 1.54–1.55 |
| Urea formaldehyde resin | 1.54–1.56 |
| Poly(sec-butyl α-bromoacrylate) | 1.542 |
| Poly(cyclohexyl α-bromoacrylate) | 1.542 |
| Poly(2-bromoethyl methacrylate) | 1.5426 |
| Poly(dihydroabietic acid) | 1.544 |
| Poly(abietic acid) | 1.546 |
| Poly(ethylmercaptyl methacrylate) | 1.547 |
| Poly(N-allyl methacrylamide) | 1.5476 |
| Poly(1-phenylethyl methacrylate) | 1.5487 |
| Poly(vinylfuran) | 1.55 |
| Poly(2-vinyltetrahydrofuran) | 1.55 |
| Poly(vinyl chloride) + 40% trictesyl phosphate | 1.55 |
| Epoxy resins | 1.55–1.60 |
| Poly(p-methoxybenyl methacrylate) | 1.552 |
| Poly(isopropyl methacrylate) | 1.552 |
| Poly(p-isopropylstyrene) | 1.554 |
| Poly(chloroprene) | 1.554–1.558 |
| Poly(oxyethylene)-α-benzoate-ω-methacrylate) | 1.555 |
| Poly(p,p'-xylylenyl dimethacrylate) | 1.5559 |
| Poly(1-phenylallyl methacrylate) | 1.5573 |
| Poly(p-cyclohexylphenyl methacrylate) | 1.5575 |
| Poly(2-phenylethyl methacrylate) | 1.5592 |
| Poly(oxycarbonyloxy-1,4-phenylene-1-propyl butylidene-1,4-phenylene) | 1.5602 |
| Poly(1-(o-chlorophenyl)ethyl methacrylate) | 1.5624 |
| Poly(styrene-co-maleic anhydride) | 1.564 |
| Poly(1-phenylcyclohexyl methacrylate) | 1.5645 |
| Poly(oxycarbonyloxy-1,4-phenylene-1,3-dimethyl-butylidene-1,4-phenylene) | 1.5671 |
| Poly(methyl α-bromoacrylate) | 1.5672 |
| Poly(benzyl methacrylate) | 1.5680 |
| Poly(2-phenylsulfonyl)ethyl methacrylate) | 1.5682 |
| poly(m-cresyl methacrylate) | 1.5683 |
| Poly(styrene-co-acrylonitrile) (ca, 75/25) | 1.57 |
| Poly(oxycarbonyloxy-1,4-phenyleleneisobutylidene-1,4-phenylene) | 1.5702 |
| Poly(o-methoxyphenyl methacrylate) | 1.5705 |
| Poly(phenyl methacrylate) | 1.5706 |
| Poly(o-cresyl methacrylate) | 1.5707 |
| Poly(diallyl phthalate) | 1.572 |
| Poly(2,3-dibromopropyl methacryate) | 1.5739 |
| Poly(oxycarbonyloxy-1,4-phenylene-1-methyl-butylidene-1,4-phenylene) | 1.5745 |
| Poly(oxy-2,6-dimethylphenylene) | 1.575 |
| Poly(oxyethyleneoxyterephthaloyl) (amorphous) (poly(ethylene terephthalate)) (crystalline fiber: 1.51 transverse; 1.64 in fiber direction) | 1.5750 |
| Poly(vinyl benzoate) | 1.5775 |
| poly(oxycarbonyloxy-1,4-phenylenebutylidene-1,4-phenylene) | 1.5792 |

TABLE 1-continued

| Polymer name: | Approximate Refractive Index |
|---|---|
| Poly(1,2-diphenylethyl methacrylate) | 1.5816 |
| Poly(o-chlorobenzyl methacrylate) | 1.5823 |
| Poly(oxycarbonyloxy-1,4-phenylene-sec-butylidene-1,4-phenylene) | 1.5827 |
| Poly(oxypentaerythritoloxyphthaloyl) | 1.584 |
| Poly(m-nitrobenyl methacrylate) | 1.5845 |
| Poly(oxycarbonyloxy-1,4-phenyleneisopropylidene-1,4-phenylene) | 1.5850 |
| Poly(N-(2-phenylethyl)methacrylamide) | 1.5857 |
| Poly(4-methoxy-2-methylstyrene) | 1.5868 |
| Poly(o-methylstyrene) | 1.5874 |
| Poly(styrene) | 1.59–1.592 |
| Poly(oxycarbonyloxy-1,4-phenylenecyclohexylidene-1,4-phenylene) | 1.5900 |
| Poly(o-methoxystyrene) | 1.5932 |
| Poly(diphenylmethyl methacrylate) | 1.5933 |
| Poly(oxycarbonyloxy-1,4-phenyleneethylidene-1,4-phenylene) | 1.5937 |
| Poly(p-bromophenyl methacrylate) | 1.5964 |
| Poly(N-benzyl methacrylamide) | 1.5965 |
| Poly(p-methoxystyrene) | 1.5967 |
| Hard rubber (32% S) | 1.6 |
| Poly(vinylidene chloride) | 1.60–1.63 |
| Poly(sulfides ("Thiokol") | 1.6–1.7 |
| Poly(o-chlorodiphenylmethyl methacrylate) | 1.6040 |
| Poly(oxycarbonyloxy-1,4-(2,6-dichloro)phenylene-isopropylidene-1,4-(2,6-dichloro)phenylene)) | 1.6056 |
| Poly(oxycarbonyloxybis(1,4-(3,5-dichiorophenylene)) | 1.6056 |
| Poly(pentachiorophenyl methacrylate) | 1.608 |
| Poly(o-chlorostyrene) | 1.6098 |
| Poly(phenyl α-bromoacrylate) | 1.612 |
| Poly(p-divinylbenzene) | 1.6150 |

The iridescent film of the present invention can also be obtained by coextruding the naphthalate-based polyester or copolyester resin with a different transparent naphthalate-based polyester which is selected to differ in refractive index by at least about 0.03 and preferably at least 0.06.

The outermost layers of the iridescent film of the present invention can be the same or different from resins in the optical core. For example, the outermost layers can comprise a polyester or copolyester resin such as polybutylene terephthalate polyester or glycol modified polyethylene terephthalate like PETG polyester.

The number of layers in the iridescent film of the invention is at least 10 layers, preferably at least 35 layers and more preferably at least about 70 layers.

A preferred combination in accordance with this invention involves an iridescent film having the contiguous adjacent layers in the optical core being of different transparent thermoplastic resinous materials of which one is polyethylene naphthalate polyester or copolyester, and the other is polybutylene terephthalate polyester or copolyester, wherein the outermost layers are polybutylene terephthalate or PETG polyester.

The delamination resistance of a film is tested by restraining one surface of the film with adhesive tape. A second piece of adhesive tape is applied to the other surface of the film. This second piece of tape is then pulled away and any indications of delamination is noted. If no delamination is observed, the tape is reapplied and the test repeated until failure is noted. Different tapes with different tack levels can be used to more fully differentiate between various film structures. Additionally, the film sample being tested can be immersed in solvent prior to testing or may be scored to provide a more severe form of this test. The number of pulls to failure using a particular tape is typically recorded. A description of this test method can be found in U.S. Pat. No. 5,089,318.

To test the solvent resistance of the film, samples of the film are immersed in the challenge solvent. The sample is observed for any color change, for the time at which the solvent begins to affect the iridescent color of the film and the nature of the color change. The time to initial color change and the nature of the color change at set time intervals are recorded. This test is typically run for a period of seven days with observations taken throughout the seven-day period. At the end of the seven days, the film sample is removed from the challenge solvent and allowed to dry for twenty-four hours. After the twenty-four hour drying period, the tester notes how the iridescent film color has changed. This data is referred to as the "Color Recovery".

To test the heat shrinkage of the film, a 2"×2" piece of film is cut from the film in question. The color of this piece is measured using a spectrophotometer. Data measured include the dominant wavelength (DWL), peak wavelength (PWL), and % peak reflection of the sample. The test specimen is then placed in an oven at the test temperature for a period of fifteen minutes. The sample is then removed from the oven. The sample is measured using a ruler to determine the percentage of shrinkage experienced by the film. The color of the sample is re-measured and the changes in DWL, PWL and peak reflection are recorded. The color of the sample after heat exposure is also compared to the original color of the test material by the person performing the test. Using all of this data, the temperature at which the film color begins to change is determined. This value is referred to as the "Color Shift Temperature".

EXAMPLE 1

Iridescent Films IF(1–4)

Polybutylene terephthalate thermoplastic polyester was fed to the feedblock from one extruder and polymethyl methacrylate from a second extruder to form four films of varying thickness (IF(1)=1.1 mils (28 μm), IF(2)=1.2 mils (30 μm), IF(3)=1.3 mils (33 μm), IF(4)=1.4 mils (36 μm)), each consisting of a 226 optical layer film and two polyethylene terephthalate polyester skin layers (see Table 2). The films were brightly iridescent and shared the same properties. These films' solvent resistance and temperature stability are described below in Tables 3 and 4.

TABLE 2

Color and thickness of IF (1–4)

| Film | Colors when seen by reflection at perpendicular incidence | Dominant Wavelength (nm) | Thickness (mils/μm) |
|---|---|---|---|
| IF (1) | Blue/Violet | 465 | 1.1/28 |
| IF (2) | Blue/Green | 485 | 1.2/30 |
| IF (3) | Red/Green | 555 | 1.3/33 |
| IF (4) | Red/Red | 590 | 1.4/36 |

TABLE 3

Properties of IF (1–4)

| Property | Nominal Value |
| --- | --- |
| Maximum Process Temp. (° F./° C.) (Under Tension) | 180/81 |
| Color Shift Temperature (° F./° C.) | 225/107 |
| Color Loss Temperature (° F./° C.) | 425/218 |

TABLE 4

Solvent Resistance of IF (1–4)

| Challenge Solvent | Time to initial change | Immersion Time 5 min | Immersion Time 24 Hours | Immersion Time 7 Days | Color Recovery |
| --- | --- | --- | --- | --- | --- |
| Alcohols (Ethanol, Isopropanol) | N/A | N | N | N | N/A |
| Aliphatic Hydrocarbons (Hexane, Naptha) | N/A | N | N | N | N/A |
| Aromatic Hydrocarbons (Benzene, Toluene) | 1 Hour | N | CC | CC | CL |
| Ketones (Acetone, MEK) | <5 min | CC | CC | CC | CL |
| Esters (Butyl Acetate, Ethyl Acetate) | <5 min | CS | CC | CC | CL |
| Fully Halogenated Hydrocarbons (Carbon Tet., Perchloroethylene) | N/A | N | N | N | N/A |
| Partially Halogenated Hydrocarbons (Ethylene Dichloride, Trichloroethylene) | <5 min | CC | CC | CC | CL |

Key
N - No Change
CS - Color Shift (Sample has started to change color due to solvent immersion)
CC - Color Change (Total color change due to solvent immersion)
CL - Color Loss
Color Recovery
The appearance of the material after removal from solvent immersion and the sample has dried.
Excellent - Material recovers to initial appearance
Good - Color recovery with some color shift
Fair - Some color recovery with significant color shift
None - No color recovery
Color Loss - Material loses iridescent color upon removal from solvent.

IF(1–4) were also tested for delamination using Scotch 396 pull tape according to the above-described procedure. The skin layers delaminated after the first pull while delamination of the optical core occurred after 5 pulls.

EXAMPLE 2

Iridescent Films IF(5–8)

Polybutylene terephthalate thermoplastic polyester was fed to the feedblock from one extruder and ethylene vinyl acetate copolymer from a second extruder to form four films of varying thickness (IF(5)=1.1 mils (28 μm), IF(6)=1.2 mils (30 μm), IF(7)=1.3 mils (33 μm), IF(8)=1.4 mils (36 μm)), each consisting of a 226 optical layer film and two polymethyl methacrylate skin layers (see Table 5). The films were brightly iridescent and shared the same properties. These films' solvent resistance and temperature stability are described below in Tables 6 and 7.

TABLE 5

Color and thickness of IF (5–8)

| Film | Colors when seen by reflection at perpendicular incidence | Dominant Wavelength (nm) | Thickness (mils/μm) |
| --- | --- | --- | --- |
| IF (5) | Blue/Violet | 465 | 1.1/28 |
| IF (6) | Blue/Green | 485 | 1.2/31 |
| IF (7) | Red/Green | 555 | 1.3/33 |
| IF (8) | Red/Red | 590 | 1.4/36 |

TABLE 6

Properties of IF (5–8)

| Property | Nominal Value |
| --- | --- |
| Maximum Process Temp. (° F./° C.) (Under Tension) | 170/75 |
| Color Shift Temperature (° F./° C.) | 225/107 |
| Color Loss Temperature (° F./° C.) | 420/215 |

TABLE 7

Solvent Resistance of IF (5–8)

| Challenge Solvent | Time to initial change | Immersion Time 5 min | Immersion Time 24 Hours | Immersion Time 7 Days | Color Recovery |
| --- | --- | --- | --- | --- | --- |
| Alcohols (Ethanol, Isopropanol) | N/A | N | N | N | N/A |
| Aliphatic Hydrocarbons (Hexane, Naptha) | 15 min | N | CS | CC | None |
| Aromatic Hydrocarbons (Benzene, Toluene) | <5 min | CS | CC | CC | Good |
| Ketones (Acetone, MEK) | <5 min | CS | CS | CS | Excellent |
| Esters (Butyl Acetate, Ethyl Acetate) | <5 min | CS | CS | CS | Excellent |
| Fully Halogenated Hydrocarbons (Carbon Tet., Perchloroethylene) | <5 min | CS | CC | CC | Fair |
| Partially Halogenated Hydrocarbons (Ethylene Dichloride, Trichloroethylene) | <5 min | CC | CC | CC | Good |

Key - see Table 4

IF(5–8) were also tested for delamination using Scotch 396 pull tape according to the above-described procedure. Both the skin and the optical core delaminated after the first pull.

EXAMPLE 3

Iridescent Films IF(9–12)

Polybutylene terephthalate thermoplastic polyester was fed to the feedblock from one extruder and polyethylene naphthalate polyester from a second extruder to form four films of varying thickness (IF(9)=1.1 mils (28 μm), IF(10)= 1.2 mils (30 μm), IF(11)=1.3 mils (33 μm), IF(12)=1.4 mils (36 μm)), each consisting of a 226 optical layer film and two polybutylene terephthalate polyester skin layers (see Table 8). The films were brightly iridescent and shared the same properties. These films' solvent resistance and temperature stability are described below in Tables 9 and 10.

TABLE 8

Color and thickness of IF (9–12)

| Film | Colors when seen by reflection at perpendicular incidence | Dominant Wavelength (nm) | Thickness (mils/μm) |
|---|---|---|---|
| IF (9) | Blue/Violet | 465 | 1.1/28 |
| IF (10) | Blue/Green | 485 | 1.2/31 |
| IF (11) | Red/Green | 555 | 1.3/33 |
| IF (12) | Red/Green | 590 | 1.4/36 |

TABLE 9

Properties of IF (9–12)

| Property | Nominal Value |
|---|---|
| Maximum Process Temp. (° F./°C.) (Under Tension) | N/A |
| Color Shift Temperature (° F./° C.) | 380/193 |
| Color Loss Temperature (° F./° C.) | 450/232 |

TABLE 10

Solvent Resistance of IF (9–12)

| Challenge Solvent | Time to initial change | 5 min | 24 Hours | 7 Days | Color Recovery |
|---|---|---|---|---|---|
| Alcohols (Ethanol, Isopropanol) | N/A | N | N | N | N/A |
| Aliphatic Hydrocarbons (Hexane, Naptha) | N/A | N | N | N | N/A |
| Aromatic Hydrocarbons (Benzene, Toluene) | 48 Hours | N | N | CS | Excellent |
| Ketones (Acetone, MEK) | 3 Hours | N | CC | CC | Excellent |
| Esters (Butyl Acetate, Ethyl Acetate) | 5 Hours | N | CC | CC | Excellent |
| Fully Halogenated Hydrocarbons (Carbon Tet., Perchloroethylene) | N/A | N | N | N | N/A |
| Partially Halogenated Hydrocarbons (Ethylene Dichloride, Trichloroethylene) | <5 min | CS | CC | CC | Fair |

Key - see Table 4

IF(9–12) were also tested for delamination using Scotch 396 pull tape according to the above-described procedure. Both the skin and the optical core showed no delaminated after 10 pulls.

EXAMPLE 4

Iridescent Film IF(13–18)

Resin A will be fed to the feedblock from one extruder and resin B from another extruder to form five films, IF(13–18) according to Table 11. Each film will consist of 100 layers and will be about 1.1 mils (28 μm) in thickness.

TABLE 11

| Film | Resin A | Resin B |
|---|---|---|
| IF (13) | Fluorinated ethylene-propylene copolymer | Polymethyl acrylate |
| IF (14) | Polybutylene terephthalate | Ethylene vinyl acetate |
| IF (15) | Polybutylene terephthalate | Propylene-ethylene copolymer |
| IF (16) | Polybutylene terephthalate | Butylene naphthalate polyester |
| IF (17) | Polybutylene terephthalate | Butylene naphthalate and ethylene naphthalate copolyester |
| IF (18) | Butylene naphthalate polyester | Butylene naphthalate and ethylene naphthalate copolyester |

When compared to IF (13–15), it will be demonstrated that IF (16–18) has better delamination resistance, temperature stability and solvent resistance (with regard to at least one solvent).

The invention has been described in terms of preferred embodiments thereof, but is more broadly applicable as will be understood by those skilled in the art. The scope of the invention is therefore limited only by the following claims.

What is claimed is:

1. An iridescent transparent thermoplastic resinous laminate film of at least 10 layers of uniform thickness of about 30 to 500 nm, said layers being parallel, the contiguous adjacent layers being of different transparent thermoplastic resinous materials, each having a refractive index, of which one is a naphthalate-based polyester or copolyester resin, the contiguous adjacent layers different in refractive index by at least 0.03.

2. The transparent thermoplastic resinous laminate film of claim 1, wherein said naphthalate-based polyester or copolyester is a naphthalene dicarboxylate-based polyester or copolyester.

3. The transparent thermoplastic resinous laminate film of claim 2, wherein said naphthalene dicarboxylate-based polyester is polyethylene naphthalate.

4. The transparent thermoplastic resinous laminate film of claim 2, wherein said naphthalene dicarboxylate-based polyester is polybutylene naphthalate.

5. The transparent thermoplastic resinous laminate film of claim 2, wherein said naphthalene dicarboxylate-based copolyester comprises ethylene naphthalate.

6. The transparent thermoplastic resinous laminate film of claim 2 wherein said naphthalene dicarboxylate-based copolyester comprises butylene naphthalate.

7. The transparent thermoplastic resinous laminate film of claim 2, wherein said naphthalene dicarboxylate-based copolyester comprises ethylene naphthalate and butylene naphthalate.

8. The transparent thermoplastic resinous laminate film of claim 2, wherein said naphthalene dicarboxylate-based copolyester consists of ethylene naphthalate and butylene naphthalate.

9. The transparent thermoplastic resinous laminate film of claim 1, wherein said other thermoplastic resinous material is a terephthalate thermoplastic polyester.

10. The transparent thermoplastic resinous laminate film of claim 9, wherein the terephthalate thermoplastic polyester is polybutylene terephthalate.

11. The transparent thermoplastic resinous laminate film of claim 1, wherein the outermost layers of said film comprise a polyester or copolyester resin.

12. The transparent thermoplastic resinous laminate film of claim 11, wherein the outermost layers of said film are polybutylene terephthalate.

13. The transparent thermoplastic resinous laminate film of claim 11, wherein the outermost layers of said film comprise PETG polyester.

14. The transparent thermoplastic resinous laminate film of claim 1 having at least 35 layers.

15. The transparent thermoplastic resinous laminate film of claim 1 having at least 70 layers.

16. The transparent thermoplastic resinous laminate film of claim 15, wherein the contiguous adjacent layers differ in refractive index by at least 0.06.

17. An iridescent transparent thermoplastic resinous laminate film of at least 70 layers of uniform thickness of about 30 to 500 nm, said layers being parallel, the contiguous adjacent layers being of different transparent thermoplastic resinous materials, each having a refractive index, of which one is a polyethylene naphthalate polyester or copolyester, and the other is a polybutylene terephthalate polyester or copolyester, wherein the outermost layers are polybutylene terephthalate or PETG polyester.

18. The transparent thermoplastic resinous laminate film of claim 17, wherein one of the contiguous adjacent layers is a polyethylene naphthalate polyester.

19. The transparent thermoplastic resinous laminate film of claim 17, wherein one of the contiguous adjacent layers is a polybutylene terephthalate polyester.

* * * * *